United States Patent

Akemakou

[11] Patent Number: 6,037,691
[45] Date of Patent: Mar. 14, 2000

[54] DUAL EXCITATION ELECTRICAL MACHINE, AND ESPECIALLY MOTOR VEHICLE ALTERNATOR

[75] Inventor: Dokou Antoine Akemakou, Vitry sur Seine, France

[73] Assignee: Valeo Equipments Electriques Motoer, Creteil, France

[21] Appl. No.: 09/236,250

[22] Filed: Jan. 25, 1999

[30] Foreign Application Priority Data

Jan. 26, 1998 [FR] France .................................. 98 00781

[51] Int. Cl.⁷ .................................................. H02K 1/00
[52] U.S. Cl. ........................ 310/191; 310/261; 310/156; 310/174; 310/179; 310/114
[58] Field of Search ................................ 310/191, 261, 310/156, 174, 179, 114

[56] References Cited

U.S. PATENT DOCUMENTS

| | | | |
|---|---|---|---|
| 4,980,595 | 12/1990 | Arora | 310/263 |
| 5,097,166 | 3/1992 | Mikulic | 310/156 |
| 5,132,581 | 7/1992 | Kusase | 310/263 |
| 5,397,975 | 3/1995 | Syverson | 322/46 |
| 5,663,605 | 9/1997 | Evans et al. | 310/181 |
| 5,828,154 | 10/1998 | Bahn | 310/168 |
| 5,864,198 | 1/1999 | Pinkerton | 310/266 |

FOREIGN PATENT DOCUMENTS

| | | |
|---|---|---|
| 0 707 374 A1 | 4/1996 | European Pat. Off. . |
| 41 39 843 | 6/1993 | Germany . |
| 96 30992 | 10/1996 | WIPO . |

OTHER PUBLICATIONS

English Abstract (Derwent) of European Patent Application No. EP 0 707 374 A1 to J. Lucidarme et al. (Apr.17, 1996).

Patent Abtstracts of Japan, vol. 018, No. 109 (E–1513), Feb. 22, 1994 & JP 05 304752 A (Fuji Elelctric Co Ltd), Nov. 16, 1993.

French Search Report dated Oct.23, 1998.

*Primary Examiner*—Nestor Ramirez
*Assistant Examiner*—Thanh Lam
*Attorney, Agent, or Firm*—Morgan & Finnegan, LLP

[57] ABSTRACT

A flux commutating electrical machine includes a stator and a rotor, the stator including at least one armature coil housed in at least one pair of notches and the rotor selectively establishing closed magnetic circuits around sections of the armature coil(s). At least one excitation permanent magnet establishes a magnetic flux in a circumferential direction of the rotor and at least one excitation coil establishes a localized variable magnetic flux in the same circumferential direction as the flux produced by the magnet(s). The magnet or each magnet is housed in a first rotor part defining a first pair of rotor poles, the coil is or the coils are housed in a second rotor part defining a second pair of rotor poles and the rotor parts are separated from each other by essentially magnetically non-conductive areas.

20 Claims, 2 Drawing Sheets

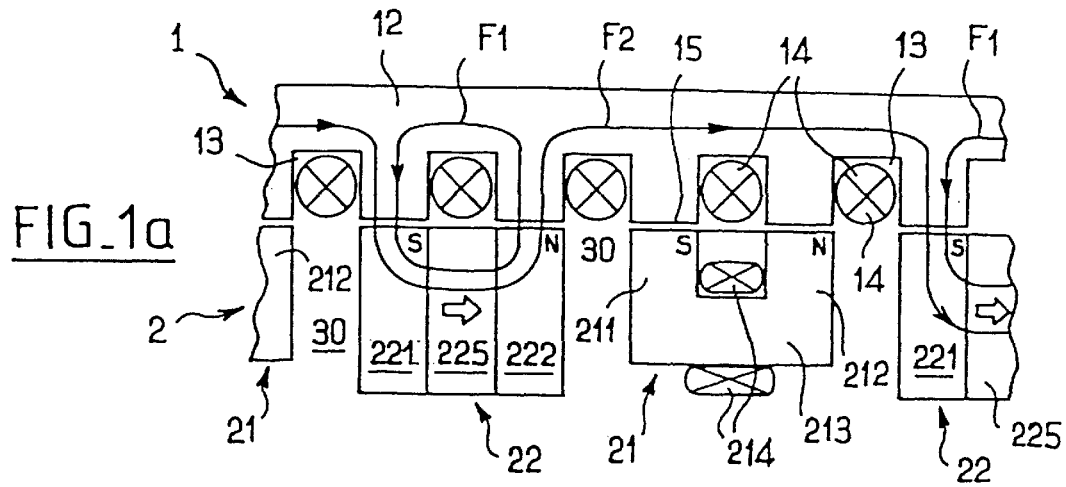
FIG_1a
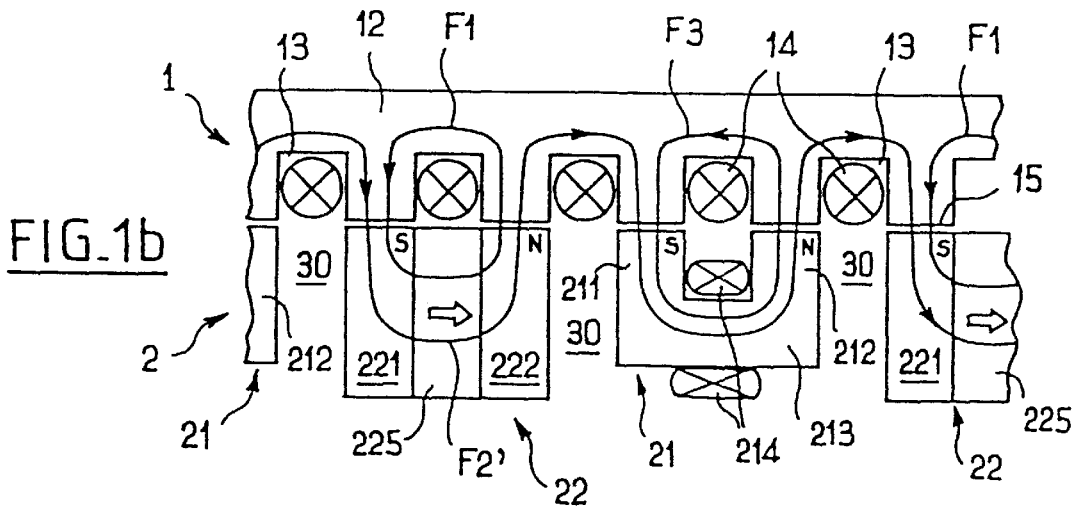
FIG_1b
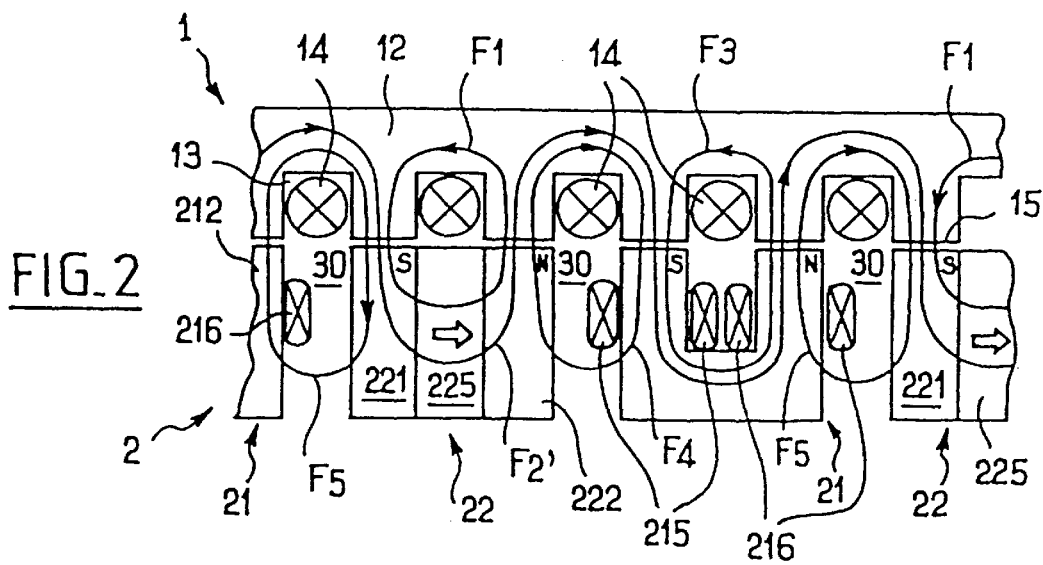
FIG_2

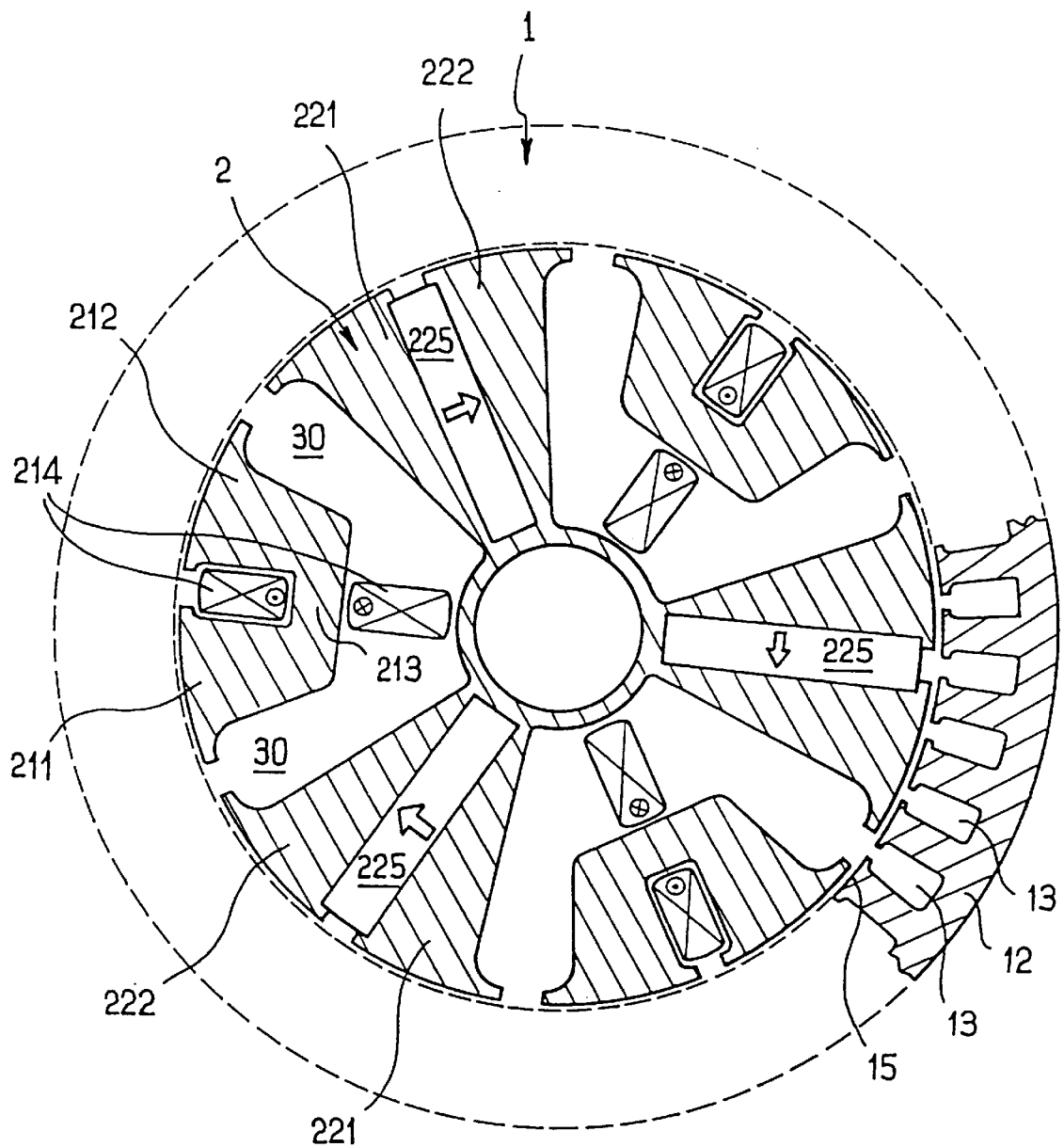
FIG_3

6,037,691

1

DUAL EXCITATION ELECTRICAL MACHINE, AND ESPECIALLY MOTOR VEHICLE ALTERNATOR

FIELD OF THE INVENTION

This invention relates to rotating machines such as motor vehicle alternators.

BACKGROUND OF THE INVENTION

The single-phase or multiphase generator constituting the conventional motor vehicle alternator generally has a stator within which rotates a rotor carrying an excitation coil. The coil is connected to brushes in contact with two slip rings on a projecting part of the rotor shaft.

EP-A-0 707 374 discloses rotating machines in which, for improved efficiency, the rotor excitation field is produced by permanent magnets and by coils (the expression "mixed excitation" is generally used), and in which the current delivered by the armature is controlled by excitation coil switching means which selectively reverse the excitation direction to reduce or even substantially eliminate the flux from the magnets.

This need to reverse the direction of the excitation current imposes the use of a so-called "H" semiconductor switching bridge, which is costly and adds to the unit cost of the machine.

DISCUSSION OF THE INVENTION

An object of the invention is to overcome the above drawbacks and to propose a machine, in particular a rotating machine such as an alternator, with mixed excitation and in which the output current can be regulated by varying unidirectional excitation by coils, and in particular by varying excitation by coils between an essentially zero value and a maximum value to deliver an energy varying in a given range. Thus in particular the invention aims to provide mixed excitation in situations that do not require an excitation varying between a zero value and a maximum value but where an excitation varying between a non-zero minimum value and a maximum value is sufficient.

Another essential object of the invention, in a machine of the above kind, is to reduce the number of magnets required for a given number of rotor poles combined with comparable levels of excitation by magnets and excitation by coils.

Accordingly the invention proposes a flux commutating electrical machine including a stator and a rotor wherein the stator includes at least one armature coil housed in at least one pair of notches, the rotor includes means for selectively establishing closed magnetic circuits around sections of the armature coil(s) including at least one excitation permanent magnet adapted to establish a magnetic flux in a circumferential direction of the rotor and at least one excitation coil adapted to establish a localized variable magnetic flux in the same circumferential direction as the flux produced by the magnet (s), the magnet or each magnet is housed in a first rotor part defining a first pair of rotor poles, the coil is or the coils are housed in a second rotor part defining a second pair of rotor poles and the rotor parts are separated from each other by essentially magnetically non-conductive areas. The machine in accordance with the invention has the following preferred but non-limiting features:

the or each second rotor part has a generally U-shape ferromagnetic part with two branches defining the two poles and receiving at least one excitation coil.

the or each second rotor part has a single excitation coil around a base of the U-shape part joining the branches

2 and adapted to create a magnetic flux propagating the same way in a generally circumferential direction as the magnetic flux generated by the or each magnet.

the or each second rotor part has two excitation coils around the branches of the U-shape part adapted to create magnetic fluxes of which one is directed towards the inside and the other towards the outside of the rotor.

the rotor has along its periphery alternating first parts and second parts.

the first rotor parts each have two ferromagnetic parts on respective opposite sides of the associated magnet.

the ferromagnetic parts of the first rotor parts form part of a single core.

the magnetically non-conductive areas are airgaps.

the magnetically non-conductive areas comprise a magnetically non-conductive material such as a plastics material.

The invention further proposes a machine as defined hereinabove constituting a motor vehicle alternator.

Other aspects, aims and advantages of the invention will appear more clearly on reading the following detailed description of preferred embodiments of the invention which is given by way of non-limiting example only and with reference to the accompanying drawings.

BRIEF DESCRIPTION OF THE DRAWINGS

FIG. 1a is a diagrammatic developed view of a rotor and stator system of a rotating machine constituting a first embodiment of the invention in a state of non-excitation of the field coils.

FIG. 1b is a view similar to FIG. 1a in a state of excitation of the field coils.

FIG. 2 is a diagrammatic developed view of a rotor and stator system of a rotating machine constituting a second embodiment of the invention in a state of excitation of the field coils.

FIG. 3 is a diagrammatic view in cross-section of a concrete embodiment of the core of a rotor and stator system conforming to FIGS. 1a and 1b.

DESCRIPTION OF PREFERRED EMBODIMENTS OF THE INVENTION

Referring first to FIGS. 1a and 1b, there is shown diagrammatically and in developed form part of a stator 1 and the corresponding part of a rotor 2 of a single-phase or multiphase electrical machine in accordance with the invention, such as an alternator.

The stator 1 has a core 12 defining a continuous annular structure with a plurality of notches 13 on its inside periphery receiving sections of armature coils 14 in a manner that in itself is entirely conventional.

There is an even number of notches 13 which are equiangularly distributed, leaving poles 15 between them.

The rotor 2 is defined by a succession of magnetically separate individual structures or cells. These structures comprise a U-shape first ferromagnetic structure 21 with two branches 211, 212 the free ends of which define two external projecting poles, the angular pitch of which is equal to that of the poles 15 of the rotor in the case of a single-phase machine, and a base 213.

An excitation coil 214 is wound around the base 213 and is connected to an excitation voltage source (not shown) to generate in it a magnetic flux from left to right as shown in FIGS. 1a and 1b.

A plurality of equi-angularly spaced U-shape structures as described above is preferably provided.

Interleaved between the U-shape structures 21 are the same number of permanent magnet structures 22 each comprising a permanent magnet 225 trapped between two ferromagnetic members 221, 222 the faces of which that face towards the stator constitute poles, the poles of the U-shape structures 211 and those of the members 221, 222 being equi-angularly spaced around the outside periphery of the rotor.

In the case of a three-phase machine the number of stator notches 13 is three times the number of rotor poles as defined hereinabove.

The structures 21 and 22 are separated by gaps 30 extending substantially the full height of the rotor (i.e. its axial dimension in the case of a cylindrical rotor).

Clearly, given the above explanations, the various components of the rotor can be provided in N sets disposed in successive groups, according to the required number of poles.

The behavior of a rotating machine, in this instance an alternator, the operating principle of which is as described hereinabove will now be described with reference to FIGS. 1a and 1b.

Consider first the situation in which there is no excitation current in the excitation coil 214 (FIG. 1a).

In this case a portion F1 of the magnetic flux generated by a permanent magnet 225 can flow in a closed loop through the associated members 221 and 222 and the stator 1, around a respective armature section 14, to generate a minimum armature current in the armature coil concerned.

Note also that another portion F2 of the flux produced collectively by the magnets follows a sinuous path along the rotor, and this flux F2 also contributes to generating a current in the armature windings.

This situation is one of minimum excitation of the machine, corresponding to the fluxes F1 and F2 generated by the magnets 225.

FIG. 1b shows the situation in which the excitation coils 214 of the rotor carry an excitation current.

Each of the coils generates a first flux portion F3 that flows in a closed loop around an associated armature coil section 14, in the same direction as the flux F1 generated by the magnets 225 (here from right to left in the stator 1).

The flux generated by the coils adds to the flux F2 described hereinabove to form a higher flux F2' that also contributes to increasing the armature current.

When the current in the excitation coils 214 is maximum there is maximum transfer of energy to the stator.

Accordingly, by controlling a unidirectional current flowing in the field coils 214 between a zero value and a maximum value a transfer of energy to the stator is achieved that varies between a non-zero minimum value and a maximum value.

The ratio between the minimum and maximum values can of course be altered by altering the values of the magnetic fluxes generated by the magnets 225 and by the coils 214, respectively.

This produces a machine in which, using a unidirectional excitation current varying between zero and a predefined maximum value, an excitation is obtained varying as a monotonous function of the current in a given range.

It is therefore possible to dispense with any "H" electronic switching bridge or the like which, in the prior art mixed excitation machines, produces a bi-directional current according to the required excitation. This significantly reduces the cost of the switching means, which can comprise a single semiconductor switching device.

Another embodiment of a rotor and stator system in accordance with the invention will now be described with reference to FIG. 2.

It differs from that shown in FIGS. 1a and 1b in that each U-shaped structure 21 no longer comprises a single coil 214 but instead two coils 215, 216 around the respective branches 211 and 212 of the U-shaped part.

Note that the dimension of the U-shaped structures 21 in the heightwise direction in FIG. 2 (i.e. in the radial direction for a cylindrical rotor) can be greater in this case, the space left free for the lower section of the coils 214 in FIGS. 1a and 1b being superfluous in this situation.

The coils 215 and 216 of the same cell are fed in series or in parallel with a current the direction of which is such that the coil 215 generates a downwards magnetic flux and the coil 216 generates an upwards magnetic flux.

The behavior of this embodiment in the absence of any excitation current is identical to that shown in FIG. 1a and will not be described again.

Its behavior with an excitation current is similar to that of FIG. 1b, and produces the same kinds of flux F1, F2' and F3. Also, note that the leakage fluxes at the two coils 215, 216, respectively designated F4 and F5, usefully contribute to the transfer of energy to the stator, their path passing around corresponding notches of the latter.

Clearly, in FIG. 1b, the leakage flux of the single coil 214, around its lower section, would be lost.

This second embodiment therefore increases the efficiency of the machine.

A concrete embodiment of a machine in accordance with the invention will now be described with reference to FIG. 3.

The stator 1 is of a type that is conventional in itself and has 36 equi-angularly spaced notches housing the various three-phase coil sections, arranged in a manner that is also conventional.

The rotor 2 has three U-shape coil cells 21 of the type shown in FIGS. 1a and 1b alternating with three permanent magnet cells 22 to define a rotor with 12 alternating N and S poles.

The magnet cell sections 221, 222 are combined in a single central core of the rotor.

The U-shape parts 211, 212, 213 of the coil cells are magnetically separated from the cells 22. In practice they can be joined to the aforementioned core by appropriate amagnetic parts, not shown.

In this regard note that the concept of the gap 30 between the adjacent cells is to be understood in the present context as a gap assuring only very limited magnetic coupling between said cells. It can therefore be an airgap or a gap partly or completely filled with an amagnetic material, in particular a plastics material.

In an embodiment that is not shown the rotor 2 can be obtained by assembling a plurality of alternating individual cells 21 and 22 using appropriate mechanical means. Of course, the present invention is not limited to the embodiments described and shown and the skilled person will know how to vary or modify them in any way within the spirit of the invention.

In particular, any combination of magnet structures and coil structures can be provided in the rotor, for example two coil structures or more between each pair of magnet structures, or two magnet structures or more between each pair of coil structures.

In this case the coils and magnets are oriented to preserve alternating N and S poles at the periphery of the rotor.

Each magnet structure 22 can have two or more magnets, the fluxes from which combine to obtain the required effect of a flux creating adjacent N and S poles on the rotor.

What is claimed is:

1. A flux commutating electrical machine comprising:
   a stator including at least one armature coil housed in at least one pair of notches; and
   a rotor including means for selectively establishing closed magnetic circuits around sections of said armature coil, said means for selectively establishing including at least one excitation permanent magnet adapted to establish a magnetic flux in a circumferential direction of said rotor and at least one excitation coil adapted to establish a localized variable magnetic flux in the same circumferential direction as the flux produced by said magnet, said magnet being housed in a first rotor part defining a first pair of rotor poles, said excitation coil being housed in a second rotor part defining a second pair of rotor poles, said first and second rotor parts being separated from each other by essentially magnetically non-conductive areas.

2. The machine according to claim 1, wherein said second rotor part has a generally U-shape ferromagnetic part with two branches defining said two poles and receiving said excitation coil.

3. The machine according to claim 2, wherein said second rotor part has a single excitation coil around a base of said U-shape ferromagnetic part joining said branches and adapted to create a magnetic flux propagating the same way in a generally circumferential direction as the magnetic flux generated by said magnet.

4. The machine according to claim 2, wherein said second rotor part has two excitation coils around said branches of said U-shape part adapted to create magnetic fluxes of which one is directed towards the inside and the other towards the outside of said rotor.

5. The machine according to claim 1, wherein said rotor has along its periphery alternating first parts and second parts.

6. The machine according to claim 1, wherein said first rotor parts each have two ferromagnetic parts on respective opposite sides of the associated magnet.

7. The machine according to claim 6, wherein said ferromagnetic parts of said first rotor parts form part of a single core.

8. The machine according to claim 1, wherein said magnetically non-conductive areas comprise airgaps.

9. The machine according to claim 1, wherein said magnetically non-conductive areas comprise a magnetically non-conductive material.

10. The machine according to claim 1 comprising a motor vehicle alternator.

11. The machine according to claim 9, wherein the non-conductive material comprises a plastic material.

12. The machine according to claim 1, wherein each magnet is housed in a respective first rotor part and each excitation coil is housed in a respective second rotor part.

13. A motor vehicle including the machine according to claim 1.

14. An apparatus comprising:
    a stator including at least one armature coil; and
    a rotor to establish closed magnetic circuits around sections of the armature, including:
        at least one first pair of rotor poles, associated with a permanent magnet, to establish a magnetic flux in a circumferential direction of the rotor, and
        at least one second pair of rotor poles, associated with an excitation coil, to establish a variable magnetic flux in the same circumferential direction as the flux produced by the permanent magnet, the first and second pairs separated from each other by an essentially magnetically non-conductive area.

15. The apparatus according to claim 14, wherein the non-conductive area comprises an air gap.

16. The apparatus according to claim 15, wherein the rotor includes a plurality of the first and second pairs of rotor poles alternating along a periphery of the rotor.

17. The apparatus according to claim 14, wherein the rotor comprises:
    at least one first rotor part for housing the magnet to define the first pair of rotor poles; and
    at least one second rotor part for housing the excitation coil to define the second pair of rotor poles.

18. The apparatus according to claim 17, wherein the second rotor part comprises a generally U-shape ferromagnetic rotor part with two branches defining two poles of the second rotor pair.

19. An apparatus comprising:
    a stator including at least one armature coil; and
    a rotor to establish closed magnetic circuits around sections of the armature, including:
        at least one first means for establishing a magnetic flux in a circumferential direction of the rotor through the use of a permanent magnet, and
        at least one second means, separated from the first means by an essentially magnetically non-conductive area, for establishing a variable magnetic flux in the same circumferential direction as the flux produced by the first means through the use of an excitation coil.

20. The apparatus according to claim 19, wherein the rotor includes a plurality of the first and second means alternating along a periphery of the rotor.

* * * * *

UNITED STATES PATENT AND TRADEMARK OFFICE
CERTIFICATE OF CORRECTION

PATENT NO. : 6,037,691
DATED      : March 14, 2000
INVENTOR(S) : Dokou A. Akemakou It is certified that error appears in the above-indentified patent and that said Letters Patent is hereby corrected as shown below:

On the title page:

In the Assignee [73], please delete "Valeo Equipments Electriques Motoer" and insert therefor --Valeo Equipements Electriques Moteur--.

Signed and Sealed this

Twenty-seventh Day of March, 2001

*Attest:*

NICHOLAS P. GODICI

*Attesting Officer*

*Acting Director of the United States Patent and Trademark Office*